(12) United States Patent
Bouchayer et al.

(10) Patent No.: US 10,816,643 B2
(45) Date of Patent: Oct. 27, 2020

(54) TEMPERATURE SENSOR SYSTEM, RADAR DEVICE AND METHOD

(71) Applicant: NXP B.V., Eindhoven (NL)

(72) Inventors: Matthis Bouchayer, Toulouse (FR); Cristian Pavao Moreira, Frouzins (FR); Dominique Delbecq, Fonsorbes (FR); Pierre Savary, Muret (FR)

(73) Assignee: NXP B.V., Eindhoven (NL)

( * ) Notice: Subject to any disclaimer, the term of this patent is extended or adjusted under 35 U.S.C. 154(b) by 328 days.

(21) Appl. No.: 15/917,070

(22) Filed: Mar. 9, 2018

(65) Prior Publication Data
US 2018/0292511 A1    Oct. 11, 2018

(30) Foreign Application Priority Data

Apr. 11, 2017 (EP) ..................................... 17305433

(51) Int. Cl.
  G01S 7/40 (2006.01)
  G01S 13/86 (2006.01)
  G01K 1/02 (2006.01)
  G01S 13/34 (2006.01)

(52) U.S. Cl.
  CPC ............ *G01S 7/4056* (2013.01); *G01K 1/026* (2013.01); *G01S 7/4004* (2013.01); *G01S 7/4008* (2013.01); *G01S 7/4017* (2013.01); *G01S 7/4021* (2013.01); *G01S 13/34* (2013.01); *G01S 13/86* (2013.01); *G01S 2007/4013* (2013.01)

(58) Field of Classification Search
CPC combination set(s) only.
See application file for complete search history.

(56) References Cited

U.S. PATENT DOCUMENTS

| | | | |
|---|---|---|---|
| 8,970,234 B2 | 3/2015 | Takayanagi et al. | |
| 9,993,166 B1* | 6/2018 | Johnson | A61B 5/0205 |
| 2003/0034887 A1* | 2/2003 | Crabtree | G01S 3/54 |
| | | | 340/539.1 |
| 2003/0117297 A1* | 6/2003 | Obradovich | G01C 21/20 |
| | | | 340/905 |
| 2011/0006897 A1* | 1/2011 | Micko | G08B 13/191 |
| | | | 340/565 |
| 2015/0241553 A1* | 8/2015 | Gehrels | G01S 7/40 |
| | | | 342/173 |
| 2016/0223411 A1* | 8/2016 | Gebhardt | G01K 11/22 |
| 2016/0291132 A1* | 10/2016 | Goto | G01S 7/4026 |
| 2017/0072850 A1* | 3/2017 | Curtis | B60W 50/14 |
| 2017/0315214 A1 | 11/2017 | Steinbuch et al. | |

* cited by examiner

*Primary Examiner* — Mamadou L Diallo
(74) *Attorney, Agent, or Firm* — Charlene R. Jacobsen

(57) ABSTRACT

A radar device (100) is described that includes at least one transceiver (205) configured to support frequency modulated continuous wave (FMCW); a digital controller (262); and a temperature sensor system comprising a plurality of temperature sensors (222, 232, 242) coupled to various circuits (220, 230, 240) in the at least one transceiver (205). The digital controller (262) of the radar device (100) is configured to monitor a temperature of the various circuits (220, 230, 240) by polling temperature values of the plurality of temperature sensors (222, 232, 242).

17 Claims, 6 Drawing Sheets

TEMPERATURE SENSOR SYSTEM, RADAR DEVICE AND METHOD

CROSS-REFERENCE TO RELATED APPLICATIONS

This application claims the priority under 35 U.S.C. § 119 of European Patent application no. 17305433.9, filed on 11 Apr. 2017, the contents of which are incorporated by reference herein.

FIELD OF THE INVENTION

The field of the invention relates to a temperature sensor system for a frequency modulated (FM), such as a FM continuous wave (FMCW) radar device, and a method therefor.

BACKGROUND OF THE INVENTION

Automotive Radar systems often consist of a multi-chip solution, combining a radar transceiver (TRx) integrated circuit (IC) and a microcontroller unit (MCU) IC. As safety is a main concern for such automotive radar systems, several types of sensors are also integrated in such multi-chip solutions to ensure that the radar device is functioning in safe operating conditions. In such applications, temperature sensors and related temperature sensor systems are of particular importance, since they can detect if the device is operating within a safe temperature range.

In a radar device transceiver, it is important to accurately sense the temperature independently of the radar device state. Two modes/states of operation for temperature sensing are employed: an IDLE state where no internal clock is available and all other functional states where an internal clock is available. The way that the temperature system is managed and monitored in each mode is, thus, different. A typical temperature sensor system includes both analog and digital parts (often separate integrated circuits) in order to provide good accuracy and programmability. Radar systems have specified an over-temperature shutdown operation with programmable thresholds for a majority of the radar device's functional states. The temperature tracking and over-temperature shutdown is typically viewed as a four step process, including: sensing, converting, digitizing, and reading. If an over-temperature is detected, a shutdown is proceeded to cool down the chip. When several sensors are used, particularly temperature sensors, the inventors of the present invention have recognized and appreciated that the temperature sensor system in an FMCW radar device, and particularly when switching between sensors, may disturb the frequency-modulated continuous wave (FMCW) modulation waveforms transmitted and received by the radar device. Such temperature sensor disturbances create glitches in the FMCW modulated signal and disturb the FMCW chirp linearity, thereby compromising the radar performance and target detection.

US 2015/0241553 A1 describes a radar data processing system that employs several sensors, including one or more temperature sensors used for monitoring the temperature. It ensures that the transmitter is operating within the approved operating conditions.

U.S. Pat. No. 8,970,234 B2 describes a threshold-based temperature-dependent power/thermal management concept with temperature sensor calibration. Temperature readings from a temperature sensor are measured and reported to a power management unit. This unit may be configured to periodically compare temperature readings from the temperature sensing units and may perform control actions to ensure that an IC is within the designated thermal limits, to avoid heat related damage.

Accordingly, it is important to provide temperature sensing whilst generating or processing modulation signals for FMCW radar devices, without creating glitches in the FMCW modulated signal and disturbing the FMCW chirp linearity.

SUMMARY OF THE INVENTION

The present invention provides a FM radar device, a temperature sensing system for such a FM radar device, and a method therefor as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Figure 1:
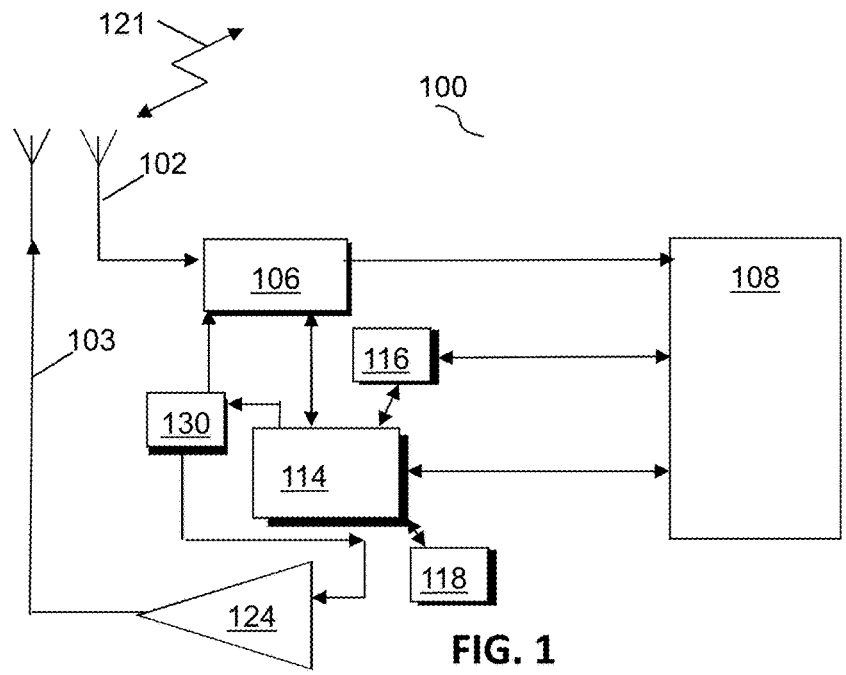
FIG. 1 illustrates a simplified block diagram of a radar device, adapted in accordance with examples of the invention.

In accordance with some example embodiments of the present invention, there is provided a FM, or more particularly a FMCW, radar unit that has multiple temperature sensors that are monitored by polling. In particular, when switching to an IDLE mode of operation from a FMCW mode of operation, one temperature sensor is selected and the sensor polling operation is halted. In this manner, timing glitches when switching between sensors, particularly in an FMCW radar device, may be substantially avoided.

Although examples of the invention are described with respect to FMCW radar systems, it is envisaged that examples of the invention may be used with any kind of frequency modulation (FM) technique (FM, FMCW, FMCW-frequency shift keyed (FSK)) that is sensitive to glitches. The described temperature sensor system, having several sensors and common circuitry to reduce die area, may be used in any type of temperature-sensitive, sensor-based device. In order to read values of all sensors used, a polling method is proposed. Furthermore, the polling technique described herein may be extended to any system or device that employs temperature sensors where it is advantageous to avoid continuously monitoring sensor values.

Examples of the invention describe a radar device that includes at least one transceiver configured to support frequency modulated continuous wave (FMCW); a digital controller; and a temperature sensor system comprising a plurality of temperature sensors coupled to various circuits in the at least one transceiver. The digital controller is configured to monitor a temperature of the various circuits by polling temperature values of the plurality of temperature sensors. The concept of 'polling' in examples of the invention encompasses a process where a controller consecutively triggers or accesses one (or more) from a plurality of sensor measurements, and particularly a temperature sensor value. In this manner, multiple temperature sensors and multiple concurrent sensor measurements can be monitored using a single processing pipeline whereby each of the plurality of measured temperature values is individually and repetitively polled.

In some examples, the temperature sensor system may include a multiplexer operably coupled to the digital controller and configured to select a single temperature value from the plurality of temperature sensors in a polling operation. In some examples, the temperature sensor system may include a single buffer operably coupled to the multiplexer and configured to provide a gain and DC level adjustment to a single output from the multiplexer across each temperature value. In some examples, the digital controller may be configured to monitor at least one temperature of the plurality of temperature sensors in both an analog domain and a digital domain.

In some examples, the digital controller may be configured to halt the polling operation of the plurality of temperature sensors upon the digital controller determining that the radar device is switched to an IDLE mode of operation from a FMCW mode of operation. In some examples, the digital controller may be configured to monitor a temperature in an IDLE mode of operation, where a selected temperature value is stored and read using a serial peripheral interface, SPI, clock. In some examples, the temperature sensor system may include a switch configurable to provide an analog temperature measurement value to an output pin when the radar device is switched to an IDLE mode of operation from a FMCW mode of operation. In some examples, the digital controller may select which temperature sensor measurement to provide to the output pin upon the radar device switching to an IDLE mode of operation.

In some examples, the temperature sensor system may include a single analog to digital converter, ADC, operably coupled to a register and configured to convert a polled analog temperature value of one of the plurality of temperature sensors to a digital format and store the digital representation of the temperature value in the register. In some examples, the single ADC may support analog to digital conversion of a plurality of temperature sensor values over at least two different ranges, whereby a first temperature range is configured to provide more resolution than a second temperature range in order to improve accuracy at the hot temperatures (e.g. In the first temperature range). In this manner, an accurate and flexible temperature sensor system in a radar transceiver is provided that includes temperature tracking and over-temperature shutdowns.

In examples of the invention, several sensors enable the temperature at different location of the chip to be known, with the possibility to read the information both in analog and digital form. A mechanism to support a digital reading of a temperature (from multiple temperature sensors) is beneficial to storing an image of the temperature in a register or memory. Additionally, in some examples, a provision of an analog voltage (termed 'SENSE' hereafter) of the raw (analog) information concerning the temperature may be advantageously measured and monitored independently from the digital code. This provides a useful back-up assessment of the device's temperature, for example should one or more of the following occur: the register is corrupted, the SPI connection is broken or busy, or if the Sensor ADC has developed a problem.

Referring now to FIG. 1, a simplified block diagram of a radar device 100 operating at millimeter (MMW) frequencies is illustrated, in accordance with examples of the invention. The radar device 100 contains one or several antennas 102 for receiving radar signals 121, and one or several antennas 103 for transmitting radar signals 121, with one respective antenna shown for each for simplicity reasons only. The number of antennas 102, 103 used may depend on the number of radar receiver and transmitter channels that are implemented in a Oven radar device. One or more receiver chains, as known in the art, include receiver front-end circuitry 106, effectively providing reception, frequency conversion, filtering and intermediate or base-band amplification, and finally an analog-to-digital conversion. In some examples, a number of such circuits or components may reside in signal processing module 108, dependent upon the specific selected architecture. The receiver front-end circuitry 106 is coupled to the signal processing module 108 (generally realized by a digital signal processor (DSP)). A skilled artisan will appreciate that the level of integration of receiver circuits or components may be, in some instances, implementation-dependent.

A controller 114, for example in a form of a microcontroller unit (MCU), maintains overall operational control of the radar device 100, and in some examples may comprise time-based digital functions (not shown) to control the timing of operations (e.g. transmission or reception of time-dependent signals, FMCW modulation generation, etc.) within the radar device 100. The controller 114 is also coupled to the receiver front-end circuitry 106 and the signal processing module 108. In some examples, the controller 114 is also coupled to a memory device 116 that selectively stores operating regimes, such as decoding/encoding functions, and the like.

As regards the transmit chain, this essentially comprises a power amplifier (PA) 124 coupled to the transmitter's one or several antennas 103, antenna array, or plurality of antennas. In radar device 100, radar transceiver topology is different from traditional wireless communication architectures (e.g. Bluetooth™ WiFi™ etc.), as modulation occurs within a phase locked loop (PLL) (typically via a fractional-N divider), and is applied directly to the PA 124. Therefore, in some examples, the receiver front-end circuitry 106 and transmitter PA 124 are coupled to frequency generation circuit 130 arranged to provide local oscillator signals. The generated local oscillator signals are thus modulated directly to generate transmit radar signals, and also used to down-convert received modulated radar signals to a final intermediate or baseband frequency or digital signal for processing in a receive operation.

In accordance with examples of the invention, at least one transceiver of the radar device 100, for example including at least one transceiver, is configured to support frequency modulated continuous wave (FMCW). A temperature sensor system 118 includes a plurality of temperature sensors coupled to various circuits in the at least one transceiver. The digital controller 114 is configured to monitor a temperature of the various circuits by polling temperature values of the plurality of temperature sensors, as described with reference to, inter alia, FIG. 2.

In FIG. 1, a single signal processor 108 or single microcontroller unit (MCU) 114 may be used to implement a processing of received radar signals. Clearly, the various components within the radar device 100 can be realized in discrete or integrated component form, with an ultimate structure therefore being an application-specific or design selection. A skilled artisan will appreciate that the level of integration of circuits or components may be, in some instances, implementation-dependent.

Figure 2:
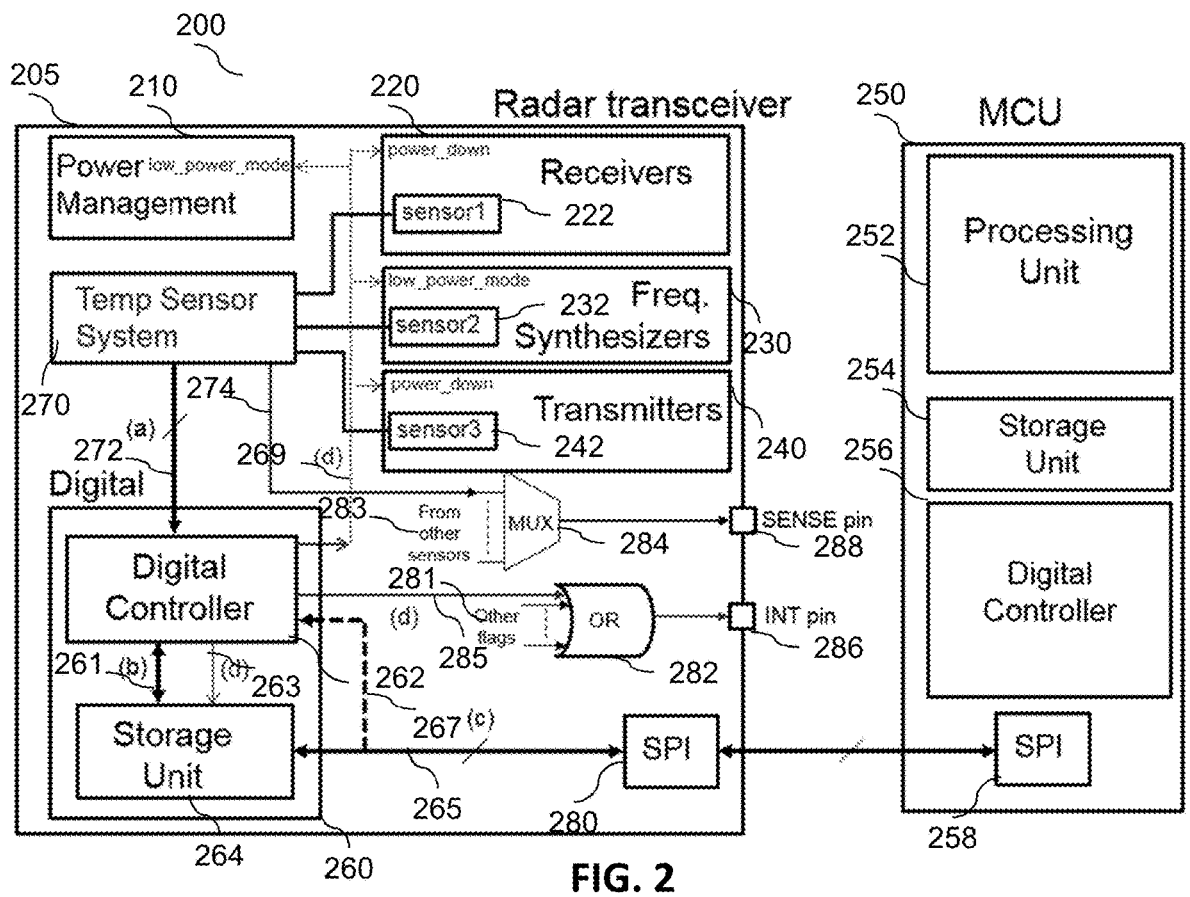
FIG. 2 illustrates a high-level temperature sensor example block diagram of a radar device, in accordance with examples of the invention.

Referring now to FIG. 2, a high-level temperature sensor example block diagram of a radar device 200 is illustrated in accordance with examples of the invention. The radar device 200 is composed of a radar transceiver 205 that includes a power management function 210, which may be in a form of a power management IC, and one or more receivers 220, frequency synthesizers 230, transmitters 240. Each of the one or more receivers 220, frequency synthesizers 230, transmitters 240, may include one or more respective temperature sensors 222, 232, 242 coupled to a temperature sensor system 270. The radar transceiver 205 also includes a digital part, which may be in a form of a digital IC 260, which includes a digital controller 262, such as MCU 114 from FIG. 1 operably coupled 261 to a storage device 264, such as registers and/or memory. The power management function 210 generates reference currents and voltages that are needed within radar device 200.

The frequency synthesizers 230 include all the function related to generation of the reference frequencies. The transmitters 240 contain the functionality related to the emitted signal, whilst the receivers 220 are dedicated to the reception and conversion of the reflected received radar signal. Amongst all the sensors implemented (with only a few potential sensors illustrated in FIG. 2 for simplicity purposes only), the temperature sensor system 270 is configured to sense an operating temperature at different locations of the radar transceiver 205. In this example, the digital controller 262 takes the values from the temperature sensor system via bus 272. These values are stored in the registers of the storage unit 264. These values can also be read by the user via the serial peripheral interfaces (SPIs) 280, and SPI 258 associated with the MCU 250, via bus 265. The digital controller 262 of the radar transceiver 205 is also directly connected to SPI 280. The MCU 250 includes a processing unit 252, a storage unit 254, a digital controller 256 and SPI 258 to communicate with the radar transceiver 205.

The stored values may also be compared to programmable thresholds (not shown). If a stored value is, say, higher than a threshold it may indicate that there is an over-temperature on the IC. In this instance, a flag is generated by the digital controller 262 and the fault condition stored in a fault register via path 263. As the IC should operate in safe conditions, a shutdown may be proceeded with in this situation.

In a shutdown situation, the digital controller 262 sends the ICs into a power-save mode in order to cool down the chip. In a typical example, receivers 222 and transmitters 242 are powered down, whilst frequency synthesizers 232 and power management function 210 are placed into a low power mode via control signals sent on path 269. Also, in some examples, a flag 285 (from a number of potential flags 281), may be sent from the digital controller 262 to the interrupt (INT) pin 286 via an 'OR' logic gate 282 to indicate externally that an interrupt event has happened. The analog value from the temperature sensor system can then also be routed and measured on a SENSE pin 288 through, say, a multiplexer 284.

In accordance with examples of the invention, the radar device includes at least one transceiver 205 configured to support frequency modulated (FM) radar signals, such as FMCW radar signals, and digital controller 262. Temperature sensor system that includes a plurality of temperature sensors 222, 232, 242 coupled to various circuits such as transmitter 240, receiver 220, frequency generation circuit 230. The digital controller 262 is configured to monitor a temperature of the various circuits by polling temperature values of the plurality of temperature sensors 222, 232, 242. In some examples, the digital controller 262 may be configured to stop the polling of sensor temperature values when a FMCW ramp process is started; and re-start the polling of sensor temperature values following a completion of an FMCW signal generation and reception process. In some examples, the multiplexer 284 under control of the digital controller 262 may be configured to select a single temperature value from the plurality of temperature sensors 222, 232, 242 in a polling operation.

The MCU 250 includes a processing unit 252, a storage unit 254, a digital controller 256 and SPI 258 in order to communicate with the radar transceiver 205. The processing unit 252 is responsible for the digital signal processing of the data received from the radar transceiver 200, this data being, say, representative of a radar target speed, distance or speed variation. The storage unit 254 is the general memory of the MCU 250 that is responsible for both dynamic data storage (random access memory (RAM) and/or flash memory) as well as read only memory (ROM) (static) data storage. The digital controller 256 is in charge of the communication between all MCU different blocks and units, together with sequencing all the process (state machine) for the correct operation of the MCU 250.

Figure 3:
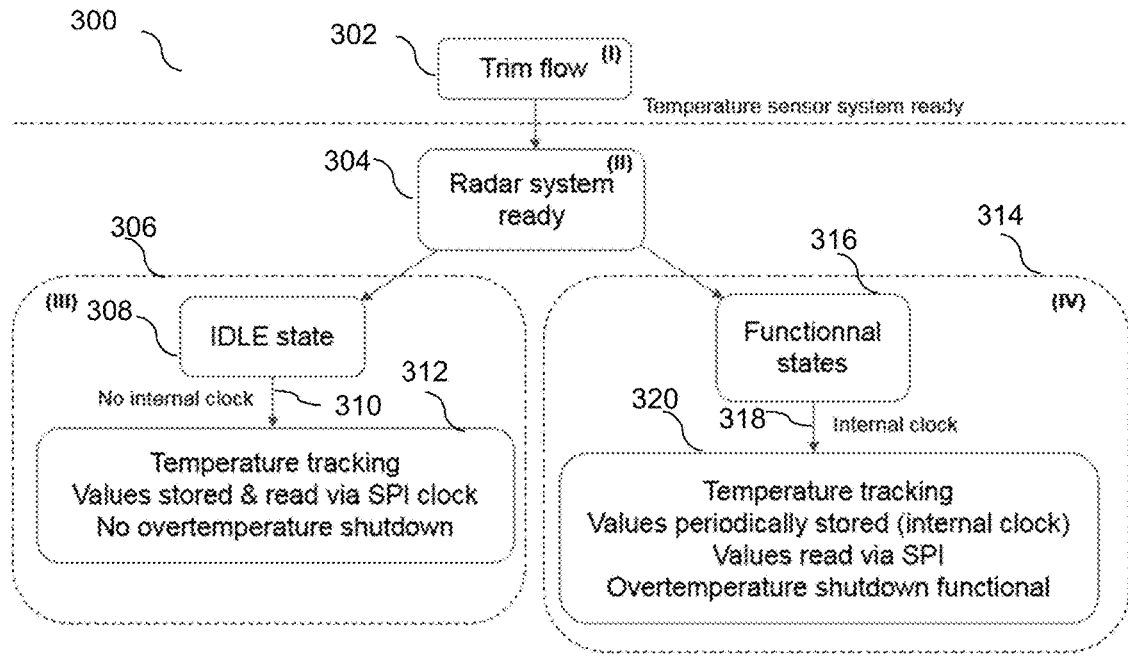
FIG. 3 illustrates a simplified flowchart of a temperature sensor system, in accordance with examples of the invention.

Referring now to FIG. 3, a temperature sensor flowchart 300 is presented, according to the different operational states supported by the radar device, such as radar device 100 of FIG. 1. In this example, prior to a first use, a trim flow operation in 302 is performed for the radar transceiver IC. A skilled person will appreciate that trimming may be performed as there are two types of variations that any IC may be subjected to that could affect its performance (or affect the performance uniformity across multiple same IC): process and mismatch variations. Therefore, in order to reduce the impact on the temperature transfer function of such process and mismatch variations between ICs, a trimming flow selects the best value of the relevant parameters that compensates for such variations, prior to first use. In this manner, the accuracy of the performance of the temperature sensors across multiple ICs and batches may be better guaranteed/matched.

After the trim flow operation in 302, the radar system is ready at 304), which means that the temperature sensor system is fully ready to operate. In this example of a temperature sensor flowchart 300, two modes are differentiated. The first mode of operation 306 is a radar device in an IDLE state 308, where there is no internal clock available 310. Thus, an SPI clock is required for the temperature tracking, storage and reading of the values in 312. The IDLE state is the safest in terms of functionality and the lowest in terms of power consumption, which means that there is no need of an over-temperature shutdown in this particular state.

In the second mode of operation 314, the various operations of the radar device are grouped into all the remaining functional states of the radar system in 316. Temperature tracking is also performed in this mode at 320. The main difference with the first IDLE mode is that an internal clock is available, and thus the temperature sensed values are polled and periodically stored. Furthermore, the stored temperature sensed values can also still be read via the SPI. The over-temperature shutdown operation is required and automatically checked at 320 too.

Figure 4:
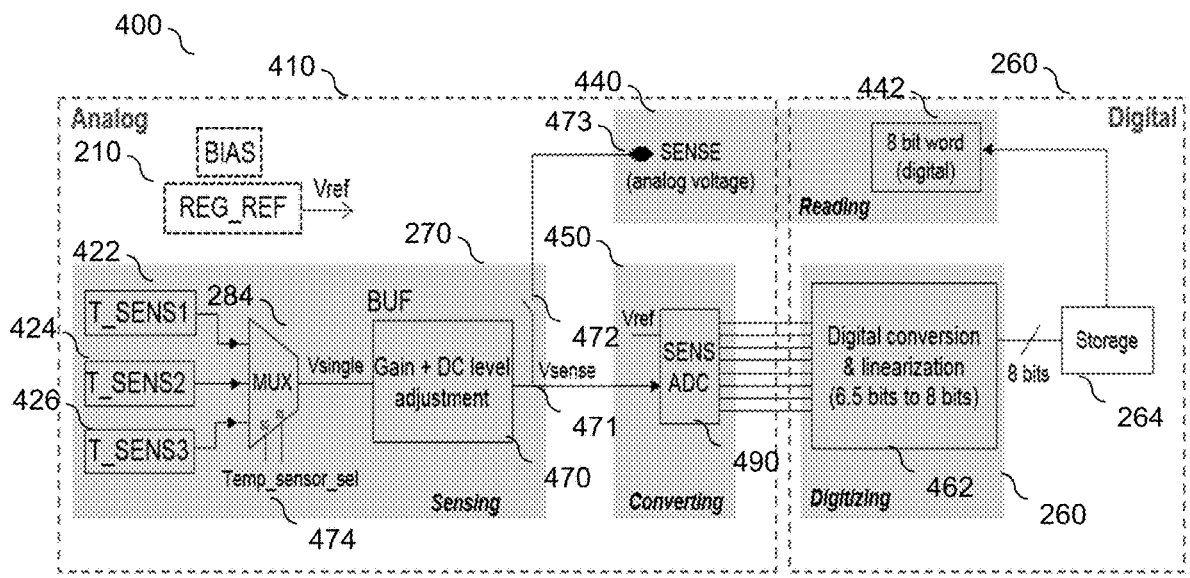
FIG. 4 illustrates a temperature sensor example block diagram of a radar device, in accordance with examples of the invention.

Referring now to FIG. 4, a temperature sensor example block diagram 400 of a radar device is illustrated, in accordance with examples of the invention. As illustrated, the temperature sensor example block diagram 400 includes, inter alia, four primary operational circuits/units: a sensing unit 270, a converting unit 450, a digitizing unit 260 and a reading unit 440. Ideally, a temperature sensor system has to deal with the following trade-offs: provide high accuracy (for both temperature tracking and programmable over-temperature shutdown), support in both analog and digital circuits in order to read the sensed temperature, limit the area taken on the chip to implement temperature sensing, as well as have low current consumption in order to avoid self-heating and power dissipation.

In some examples, the sensing unit 270 is composed of two stages: a first stage includes a number of, for example, two-diode based sensors 422, 424, 426, although other sensors can be used. A differential signal is amplified and converted to a single-ended signal. This first stage is shared between each temperature sensor (T_SENS1 ... T_SENS3) 422, 424, 426. A multiplexer 284 is configured to select one signal (or value) from the first stage in a polling operation between multiple selectable temperature signals (or values), based on a temperature sensor select control signal 474 and provides a single $V_{single}$ signal to a second stage, which in this example is a buffer 470. This second (buffer 470) stage is advantageously common for all the temperature sensors, in order to save area and reduce current consumption. In this example, the second buffer 470 stage performs both amplification and DC level adjustment. A $V_{sense}$ signal 471 output from the second buffer 470 stage is input to a sensor analog-to-digital converter (ADC) 490 in order to convert the analog data into a digital form. In some examples, a Flash-like ADC may be used, for example with two different ranges, whereby one range is configured to provide more resolution than the other range in order to improve accuracy at the hot temperatures.

In this manner, multiple temperatures are measured at different locations of the chip where a useful and significant portion of circuitry may be shared across all temperature sensors, e.g. the buffer 470 and sensor ADC 490, with just one temperature measurement being selected. In this example, the sensor ADC 490 is a single input ADC to limit the chip area used. A Flash-like structure for the ADC is chosen to be able to perform the analog-digital conversion even without a clock, in order to facilitate temperature measurements being monitored even in an IDLE state. Thus, in this example and even when there should be minimal heat generated in an IDLE state, it is possible to monitor potential problems, such as the circuit being again re-started with a still too-high temperature after an over-temp shutdown. The sensor ADC 490 uses a reference voltage $V_{ref}$, for example provided by a regulator in the power management unit 210. In some examples, at the output of the sensor ADC 490, a thermometric code is used to transfer the data into a digital form. The digitizing unit 260 performs a number of different operations. Firstly, the thermometric code is converted into a binary code, equivalent to, say, 6.5 bits in this example. As the flash-like sensor ADC 490 has, in some examples, two ranges with different resolutions, the slope of the code (in temperature) may not be linear. A linearization may thus be performed, providing, say, a code with 8 bits. This 8-bit digital value is then stored into a register, such as storage device 264 of FIG. 2. The reading unit 440 is configured to read an image of the temperature, which is advantageously possible to be read in analog form, by routing the $V_{sense}$ signal 471 on a pin (SENSE pin) 473, as well as the digital stored value being readable in digital form.

Figure 5:
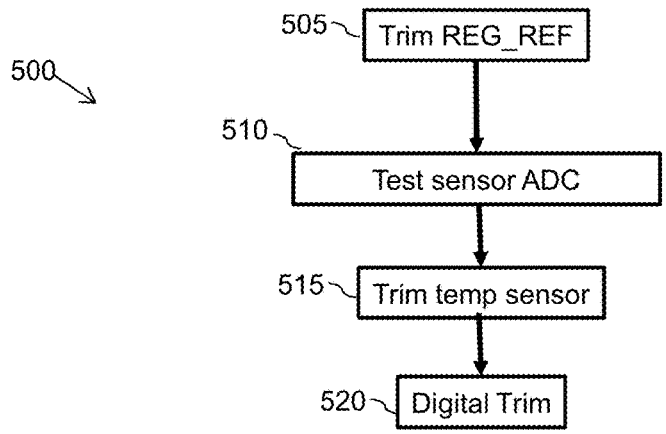
FIG. 5 illustrates an example flow diagram of a radar device, for example for the temperature sensor example block diagram of FIG. 4, in accordance with examples of the invention.

Referring now to FIG. 5, an example trimming flow diagram 500 for a temperature sensor of a radar device, for example for the temperature sensor example block diagram of FIG. 4, is illustrated in accordance with examples of the invention. First, a regulator providing the reference voltage $V_{ref}$ is trimmed in 505. The goal of trimming $V_{ref}$ is to obtain a low spread on this voltage used by the ADC, such as sensor ADC 490 of FIG. 4. Then, the ADC is characterized through testing, in order to determine precisely its input range in 510, defined by its minimum input voltage $V_{bottom}$ and its maximum input voltage $V_{rep}$. In this example, the current injected in the diodes of the T_SENS are then trimmed in 515, in order to adjust a slope in temperature. In 515, the DC level may also be trimmed though a buffer, such as buffer 470 of FIG. 4. In this manner, it may be ensured that the $V_{sense}$ voltage is inside the previously measured ADC input range. Finally, a fine digital trimming operation may be performed in the digitizing unit, such as in digitizing unit 462 in FIG. 4, in 520.

Figure 6:
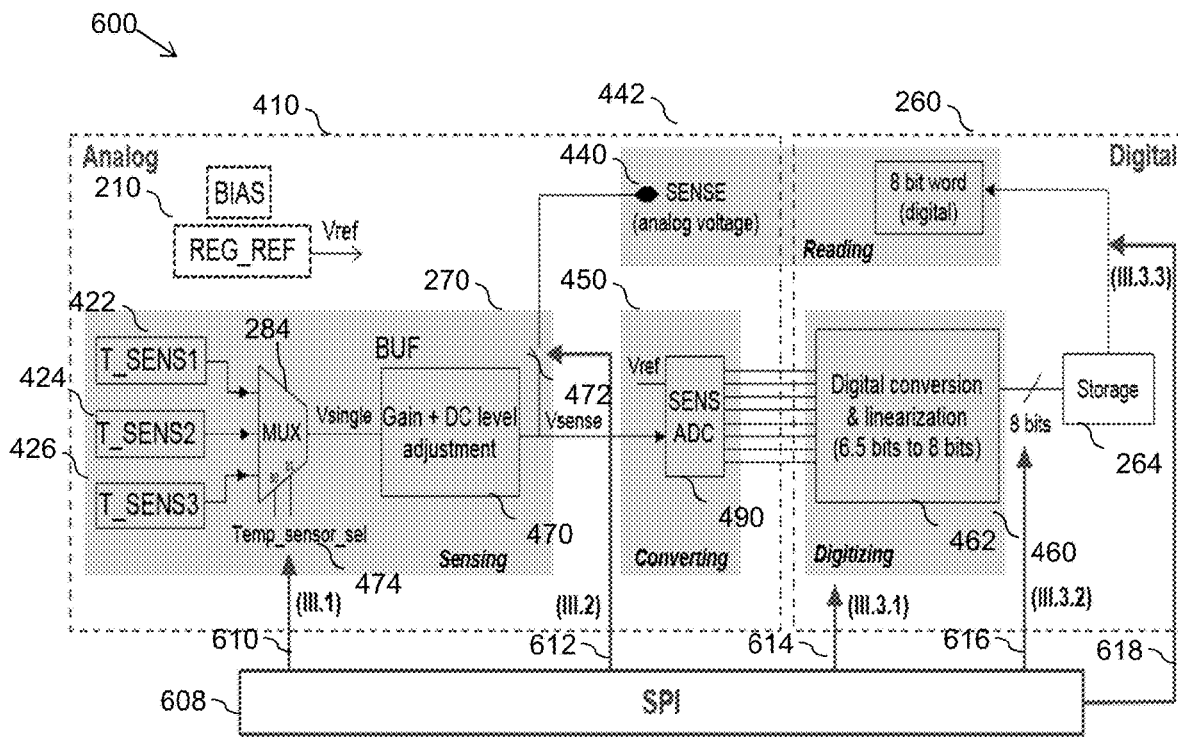
FIG. 6 illustrates an example of an IDLE state temperature measurement, in accordance with examples of the invention.

Referring now to FIG. 6, an example operation of the temperature sensor example block diagram 400 of a radar device of FIG. 4, showing an IDLE state temperature measurement 600, is illustrated, in accordance with examples of the invention. Like reference numbers are used in the drawings to identify the same functional, or functionally similar, elements. In this example, the temperature measurements in an IDLE state use an SPI clock provided from or via SPI 608, as no internal clock is available.

The selection of the temperature value is made through the multiplexer 284 that outputs one temperature sensor value, depending on the Temp_sensor_sel control signal 474, which in this example is controlled by an SPI writing operation 610. If the user of the radar device wants to measure the $V_{sense}$ analog voltage, the switch 472 that routes the voltage on the SENSE pin 440 is closed. In this example, this operation is also performed by an SPI writing operation 612 with an instruction to close the switch 472. Also, in this example, in order to obtain the digital value of the selected temperature sensor, it is possible to activate or select an SPI read operation at 614. One of several rising edges of the SPI read sequence may be used to initiate the thermometric to binary conversion, the linearization via 614, the storage of the digital value in a dedicated register via 616, and/or sending the stored value to the user via 618.

Figure 7:
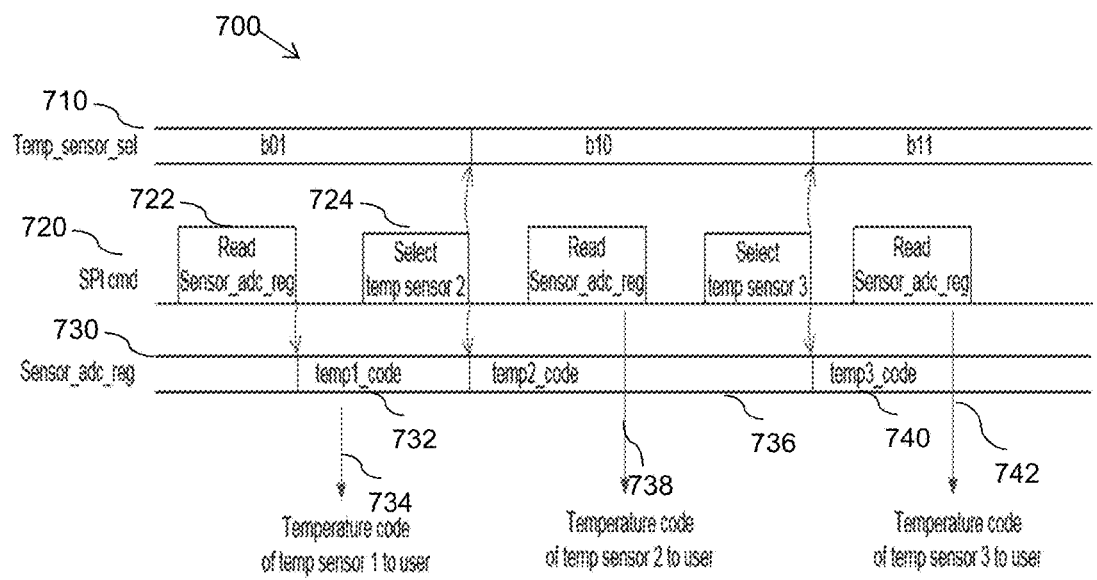
FIG. 7 illustrates an example of a timing diagram in an MILE state temperature measurement, in accordance with examples of the invention.

Referring now to FIG. 7, an example of a timing diagram 700 in an IDLE state temperature measurement is illustrated, in accordance with examples of the invention, for example as may be performed in the circuit of FIG. 6. Timing diagram 700 includes the timing of the temperature sensor select (Temp_sensor_sel) signal 710, any commands 720 from the SPI and the content of the register Sensor_adc_reg 722. In an IDLE state, the register Sensor_adc_reg 722 is dedicated to store the digital value of the selected temperature sensor. By default, temperature sensor 1 is selected (with a binary code "01" in Temp_sensor_sel signal 710) for the multiplexer, such as multiplexer 284 from FIG. 6). In this example, an SPI reading 722 of the Sensor_adc_reg 730 is performed: the value (temp1_code 732) is stored and sent 734 to the user. Then the temperature sensor 2 is selected 724 (with a binary code "10" (in Temp_sensor_sel signal 710) for the multiplexer) and the value (temp2_code 736) is stored. As an SPI command is composed of several clock cycles, when the selection of temperature sensor 2 724 is applied, one of the clock cycles of the SPI also updates the value in the Sensor_adc_reg 730. With another SPI command, the temperature code of temperature sensor 2 is sent 738 to the user. Subsequently, temperature sensor 3 is selected (with binary code "11" (in Temp_sensor_sel signal 710) for the multiplexer) and the value (temp3_code 740) is stored. It is sent 742 to the user with another SPI command.

Figure 8:
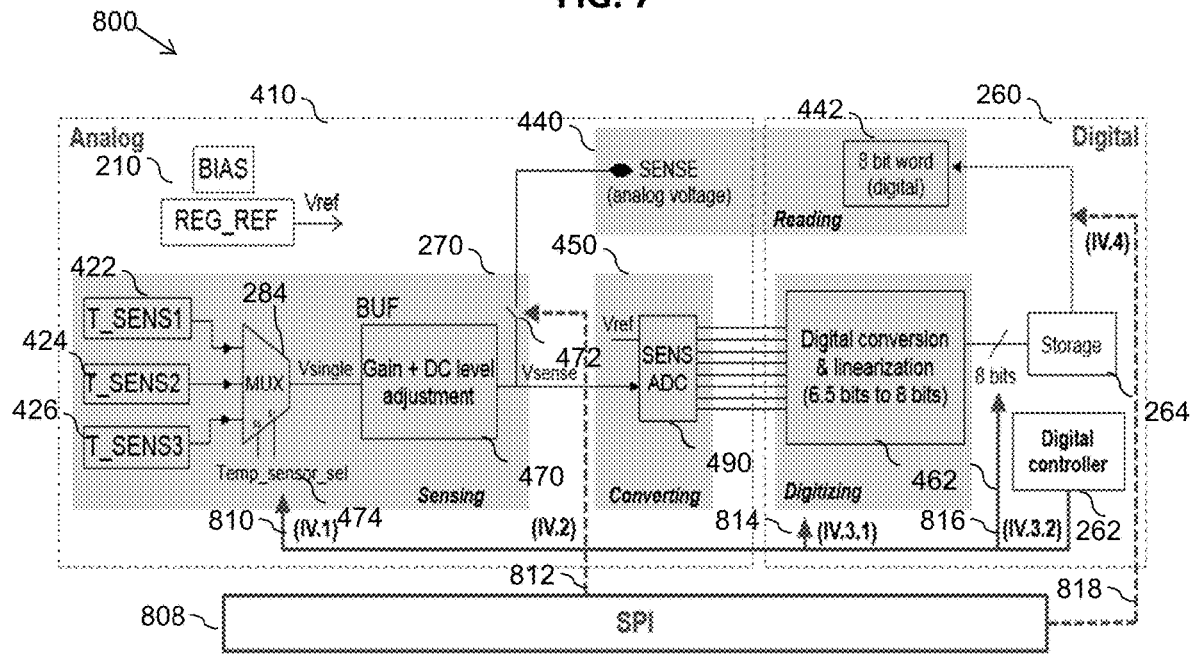
FIG. 8 illustrates an example of a Functional state temperature measurement, in accordance with examples of the invention.

In examples of the invention, when the radar device is generating or receiving an FMCW modulation, the temperature sensor system is handled differently. The dynamic signals that control the multiplexer 284 in the analog part of the chip (which perform sensor polling) must be avoided. The use of polling avoids the pollution of the modulation, generate some glitches, disturb FMCW chirp linearity, which compromises the radar performances and target detection. Referring now to FIG. 8, an example of a functional state temperature measurement 800 is illustrated in accordance with examples of the invention. Like reference numbers are used in the drawings to identify the same functional, or functionally similar, elements. In this example, an internal clock in the digital part is available. Also, in this example, the Temp_sensor_sel control signal 474 is periodically updated to automatically change (poll between) the selected temperature sensor 422, 424, 426. In this example, sensor polling between the sensors is performed using a (Temp_sensor_sel) control signal 810 initiated by digital controller 262. In this example, all the digitizing operations via. 814 and the storage of the digital value(s) via 816 are also automatically performed using this internal clock. The SPI is still used to read the temperature: either to route the selected temperature value(s) via switch 472 in response to control signal 812 the $V_{sense}$ voltage on the SENSE pin 440, or to read the stored digital value and sending the stored value to the user via path 818.

Figure 9:
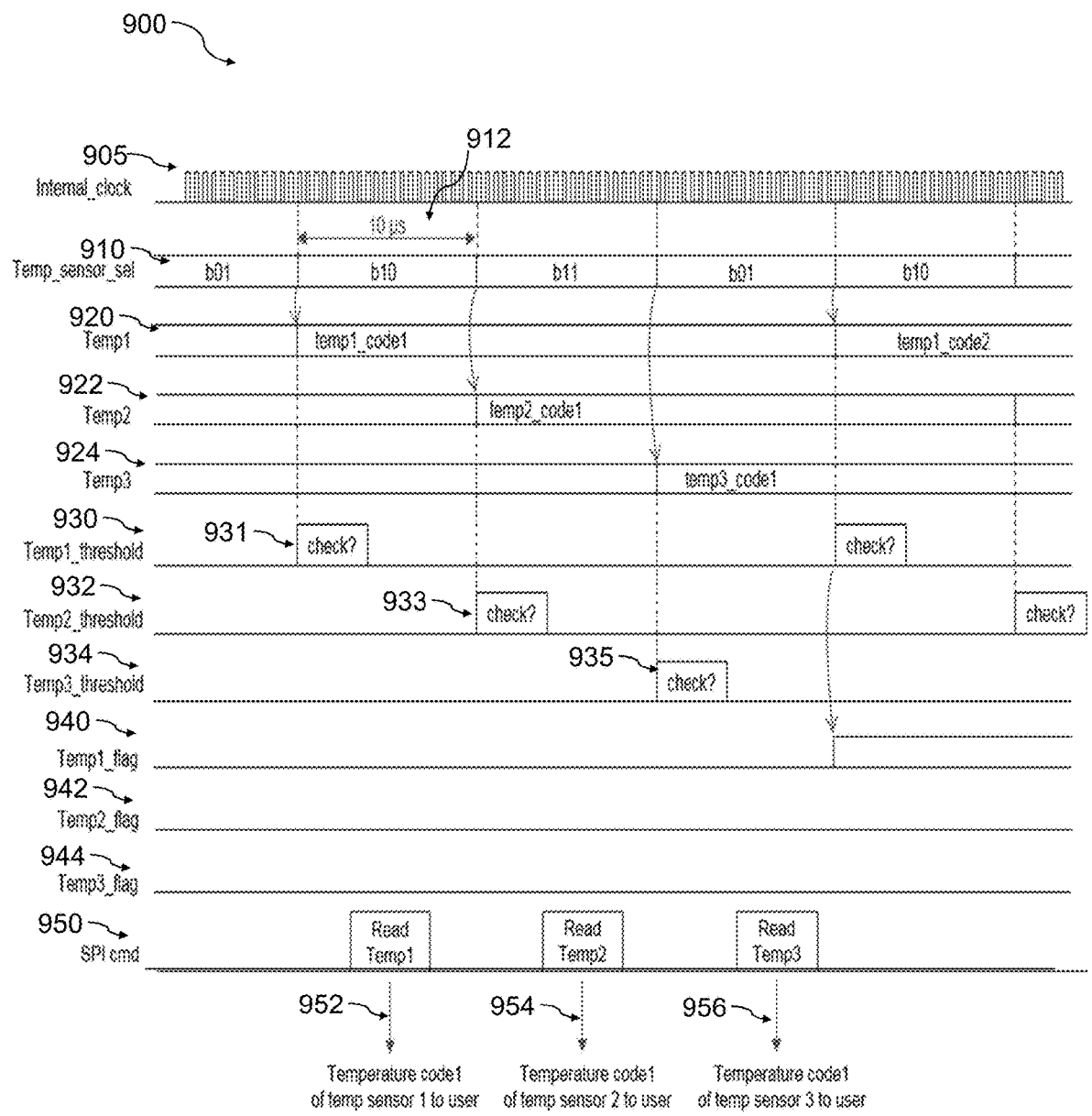
FIG. 9 illustrates an example of a timing diagram in a Functional state temperature measurement, in accordance with examples of the invention.

Referring now to FIG. 9, an example of a timing diagram 900 for functional state temperature measurements is illustrated, in accordance with examples of the invention. In these functional states, a timer regulated by the, say 60 MHz, internal clock 905 is started (noting that FIG. 9 is not to scale). The timing diagram 900 includes an indication of the content of temperature sensor registers 920, 922 or 924, the application of temperature thresholds 930, 932, 934 and the status of respective temperature flags 940, 942, 944, as hereinbefore described.

In this example, every 10 µs 912 a different temperature sensor (T_SENS1 . . . T_SENS3) in this example is selected. The different temperature sensor selection constitutes, in examples of the invention, sensor polling. At the end of the 10 µs timer period, the digital value of the selected temperature sensor is stored into a dedicated register. Temp1, Temp2 and Temp3 are the registers 920, 922 or 924 respectively corresponding to the digital values of temperature sensor 1, 2 and 3. In examples of the invention, the registers 920, 922 or 924 are periodically and automatically updated.

The value in each register 920, 922 or 924 can be read 952, 954, 956 at any moment by using the appropriate SPI command 950. Thus, the temperature code of any of temperature sensors 1 . . . 3 is obtainable by reading the Temp1 . . . Temp3 registers, where the value read may be sent to the user.

An over-temperature shutdown check may also be configured to run in parallel with the temperature measurement. At the end of each 10 µs timer, a check 931, 933, 935 is made to evaluate if the stored digital value is above a programmable threshold 930, 932, 934 respectively, in an over-temperature process. The check consists of comparing the value in, say, Temp1 register 920 to the Temp1_threshold value 930 (and so on for Temp2 and Temp3). If the value is below the threshold, the IC continues to work normally, because this indicates that it is in a safe temperature operating range. If the value stored is above the threshold, a flag, such as Temp1_flag 940, Temp2_flag 942, or Temp3_flag 944, is generated. In the example in FIG. 9, it is assumed that the temperature sensed by temperature sensor 1 becomes locally higher in the chip, leading to the generation of Temp1_flag 940. This flag indicates that a shutdown must be commenced. In some examples, the threshold levels may be programmable by the user using an SPI command 950. In some examples, the threshold levels may be the same or different for each temperature sensor and may be dynamically changed/re-programmed at any time, if needed.

It is envisaged that tracking a temperature via a temperature sensor and performing an over-temperature shutdown may be achieved in a number of envisaged different ways, with different implementations. In accordance with the examples illustrated in FIGS. 4, 6 and 8, with the solution to perform a polling of all sensors and taking into account a typical device state, IC area available, accuracy required and covering all operational states (IDLE, functional, etc.) and a sufficient number and variety of sensors, provide the opportunity to use a single buffer 470 and a single sense ADC 490. In this manner, an advantageous trade-off of many operational factors may be achieved by use of the sensor polling, in order to not pollute the FMCW ramp.

In the example topology of FIGS. 4, 6 and 8, the shutdown for each temperature sensor 422, 424, 426 may be made at different temperatures due to a use of a programmable threshold, which in some examples is independently controlled for each temperature sensor 422, 424, 426.

Figure 10:
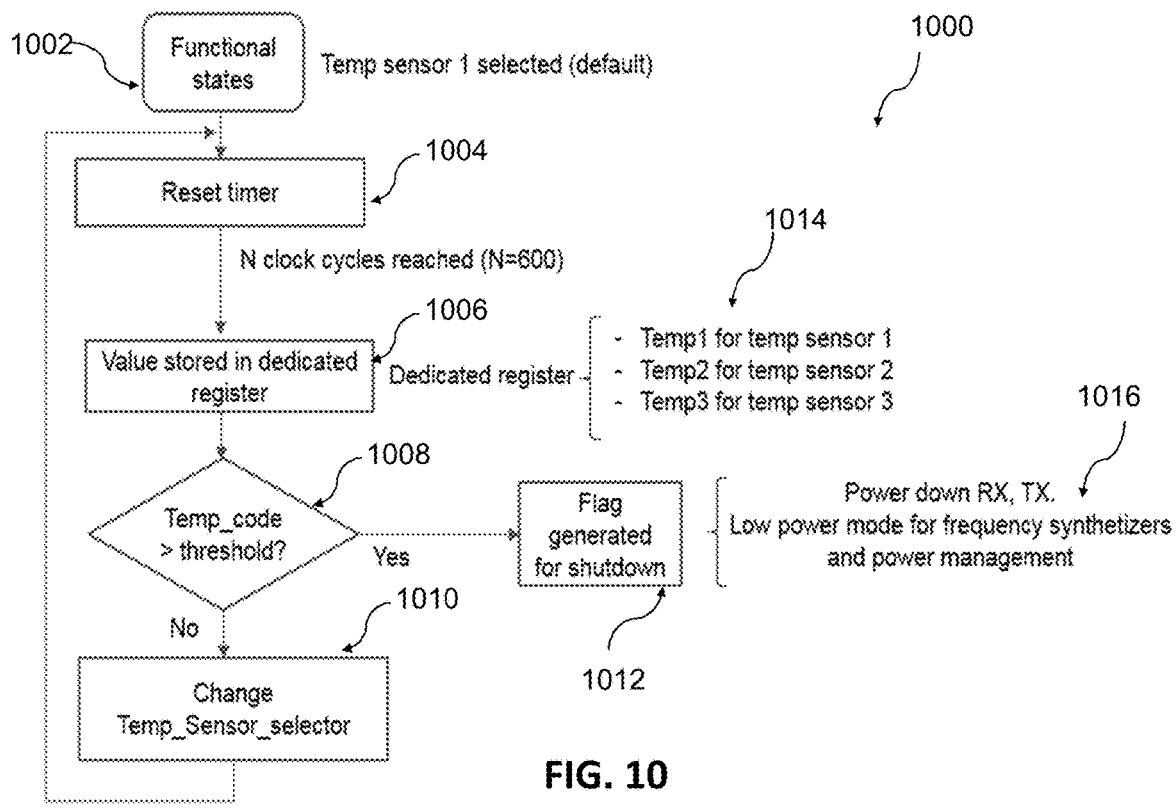
FIG. 10 illustrates a simplified flowchart of an over-temperature shutdown, in accordance with examples of the invention.

Referring now to FIG. 10, a simplified flowchart 1000 of an over-temperature shutdown operation is illustrated, in accordance with examples of the invention. As soon as the radar device is operating in any functional state at 1002, a timer managed by the digital unit starts at 1004. By default, in this example, temperature sensor 1 is the one selected for the first functional state. When a certain number N of clock cycles (e.g. N=600) is reached, the value of the selected temperature sensor is stored into the dedicated register at 1006, e.g. a first temperature for temperature sensor 1, as in 1014. Then, the stored value (Temp_code) is compared to the programmable threshold value (one per temperature sensor) at 1008. If the comparison indicates there is no over-temperature at 1008, it changes the selected temperature sensor at 1010, e.g. transitions to temperature sensor 2 and starts the cycle again at 1004. If there is an over-temperature condition at 1008, the digital unit generates an over-temperature flag and a shutdown operation is performed at 1012. At this point, a shutdown may encompass one or more of the following, at 1016: powering down of the receiver circuitry, powering down of the receiver circuitry, entering a low-power mode of operation for the frequency synthesizer(s), initiating a power management mode, etc.

Figure 11:
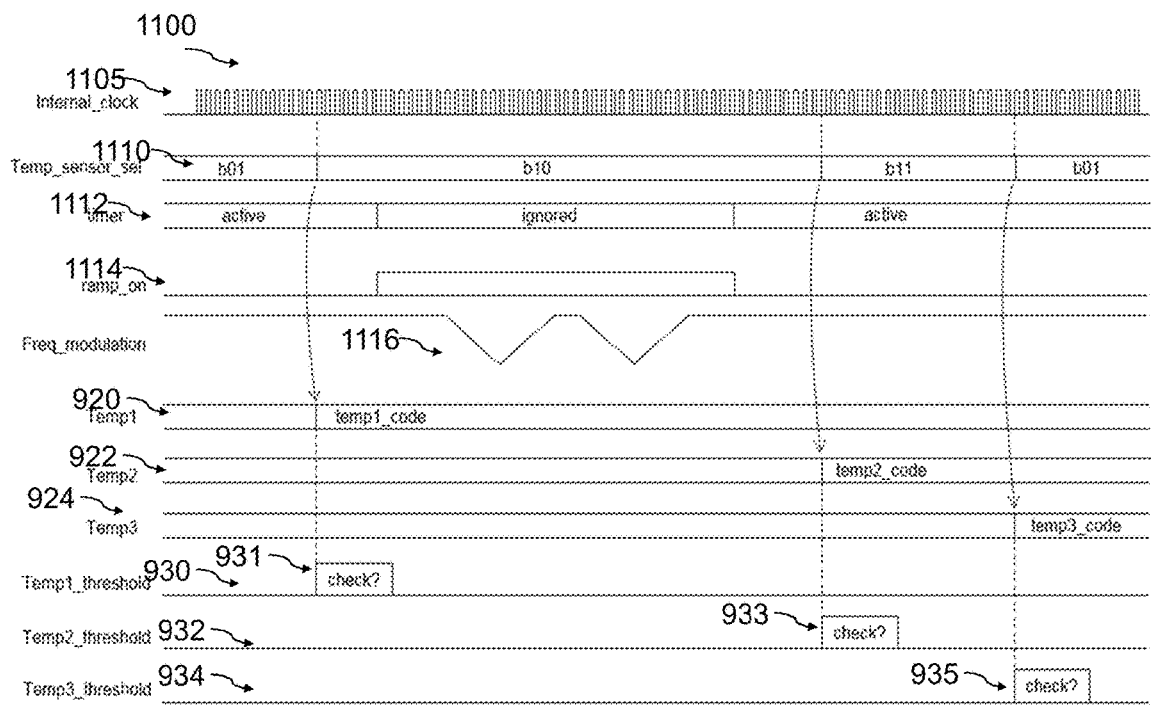
FIG. 11 illustrates an example of a timing diagram in a Functional state temperature measurement during an over-temperature shutdown, in accordance with examples of the invention.

Referring now to FIG. 11, an example timing diagram 1100 illustrates a timing of signals during a FMCW modulation phase, in accordance with examples of the invention. The timing diagram 1100 includes an internal clock 1105. When the ramp_on signal 1114 goes high, it signifies that the radar device enters into a modulation phase 1116. The timer 1112 that regulates the selected temperature sensor is ignored. The Temp_sensor_sel signal 1110 is 'on hold' and does not change for as long as the timer is 'ignored'. Thus, modulation occurs without any change of the temperature sensor selected (i.e. there is no sensor polling). When the modulation phase 1116 is finished, the ramp_on signal 1114 goes low and the timer is effective again (i.e. sensor polling is initiated). Without the modulation phase 1116, the way the values are stored and the over-temperature checks are performed the same way as described previously (FIG. 9 and FIG. 10). Thus, in this example embodiment, it is proposed to switch to the FMCW modulation phase 1116 (e.g. with a transmission of chirps) during which sensor polling is deactivated. In this example, sensor polling is re-instated when the FMCW modulation phase 1116 is terminated (e.g. In a silent mode with no modulation (or chirps)). In essence, it is possible to make sure before sending the modulated signal (e.g. ramp_on signal 1114 is activated) that the radar device is not in an 'un-safe' operational mode, so the radar device is checked to ensure that no malfunctioning flag is activated.

For the sake of clarity, it is noted that the temperature tracking and the over-temperature shutdown operations may be configured to run simultaneously, in parallel.

The inventors recognized and appreciated that when the radar device is in an IDLE state and no clock is available, a flash ADC with a high number of bits may be used in order to share and process data from multiple temperature sensors. The inventors recognized and appreciated that, if the teaching of U.S. Pat. No. 8,970,234 B2 was used in a FMCW modulated radar device, where a flash ADC could be used for temperature sensors during an IDLE state when no clock is available, glitches would be inherently generated that would disturb the chirp linearity and corrupt the radar signal integrity. Thus, examples of the present invention propose sharing of sensors using a single buffer in a sensing unit and a single flash ADC when supporting FMCW signals through a polling of the multiple sensors at a particular sampling rate in order to read all of the temperature sensed data. In this manner, with a use of a single buffer and a single ADC a chip-area efficiency is achieved to support several temperature sensors.

Furthermore, when an IDLE state is employed, and in order to avoid the inherent glitches that would occur with switching (polling) between multiple sensors, a single temperature sensor reading is selected. Furthermore, in some examples, an accurate temperature sensor system, using a single Flash-like ADC, is achieved by means of an appropriate, and simplified, trim flow performed at different block levels. Advantageously, examples of the invention also support temperature reading measurements in both or either of the analog domain and digital domain.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

Furthermore, because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented that achieve the same functionality.

Any arrangement of components to achieve the same functionality is effectively 'associated', such that the desired functionality is achieved. Hence, any two components herein combined to achieve a particular functionality can be seen as being 'associated with' each other, such that the desired functionality is achieved, irrespective of architectures or intermediary components. Likewise, any two components so associated can also be viewed as being 'operably connected,' or 'operably coupled,' to each other to achieve the desired functionality. Furthermore, those skilled in the art will recognize that boundaries between the above described operations are merely illustrative. The multiple operations may be executed at least partially overlapping in time. Moreover, alternative example embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner. Also for example, the examples, or portions thereof, may implemented as soft or code representations of physical circuitry or of logical representations convertible into physical circuitry, such as in a hardware description language of any appropriate type. Also, the invention is not limited to physical devices or units implemented in non-programmable hardware but can also be applied in wireless programmable devices or units able to perform the desired device functions by operating in accordance with suitable program code. However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one, or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A radar device comprises:
at least one transceiver configured to support frequency modulated (FM) radar signals;
a digital controller; and
a temperature sensor system comprising a plurality of temperature sensors coupled to various circuits in the at least one transceiver;
wherein the digital controller is configured to monitor a temperature of the various circuits by polling temperature values of the plurality of temperature sensors, and wherein the frequency modulated radar signals are frequency modulated continuous wave, FMCW, signals and the digital controller is configured to stop the polling of sensor temperature values when a FMCW ramp process is started and re-start the polling of sensor temperature values following a completion of an FMCW signal generation and reception process and the radar device switching to an IDLE mode of operation.

2. The radar device of claim 1 wherein the digital controller is configured to read a plurality of temperature values of the plurality of temperature sensors and compare at least one read temperature value with at least one temperature threshold value, and in response to the comparison exceeding a threshold, the digital controller initiates a shutdown operation.

3. The radar device of claim 1 wherein the temperature sensor system further comprises a single analog to digital converter, ADC, operably coupled to a register and configured to convert a polled analog temperature value of one of the plurality of temperature sensors to a digital format and store the digital representation of the temperature value in the register.

4. A radar device comprises:
at least one transceiver configured to support frequency modulated (FM) radar signals;
a digital controller; and
a temperature sensor system comprising a plurality of temperature sensors coupled to various circuits in the at least one transceiver;
wherein the digital controller is configured to monitor a temperature of the various circuits by polling temperature values of the plurality of temperature sensors, and wherein the digital controller is configured to read a plurality of temperature values of the plurality of temperature sensors and compare at least one read temperature value with at least one temperature threshold value, and in response to the comparison exceeding a threshold, the digital controller initiates a shutdown operation.

5. The radar device of claim 4, wherein the temperature sensor system further comprises a single buffer operably coupled to the multiplexer and configured to provide a gain and DC level adjustment to a single output from the multiplexer across each temperature value.

6. The radar device of claim 4, wherein the temperature sensor system further comprises a multiplexer operably coupled to the digital controller and configured to select a single temperature value from the plurality of temperature sensors in a polling operation.

7. The radar device claim 4 wherein the digital controller is configured to monitor at least one temperature of the plurality of temperature sensors in both an analog domain and a digital domain.

8. The radar device of claim 4 wherein the temperature sensor system further comprises a single analog to digital converter, ADC, operably coupled to a register and configured to convert a polled analog temperature value of one of the plurality of temperature sensors to a digital format and store the digital representation of the temperature value in the register.

9. A radar device comprises:
at least one transceiver configured to support frequency modulated (FM) radar signals;
a digital controller; and
a temperature sensor system comprising a plurality of temperature sensors coupled to various circuits in the at least one transceiver;
wherein the digital controller is configured to monitor a temperature of the various circuits by polling temperature values of the plurality of temperature sensors, and wherein the temperature sensor system further comprises a multiplexer operably coupled to the digital controller and configured to select a single temperature value from the plurality of temperature sensors in a polling operation.

10. A radar device comprises:
at least one transceiver configured to support frequency modulated (FM) radar signals;
a digital controller; and
a temperature sensor system comprising a plurality of temperature sensors coupled to various circuits in the at least one transceiver;
wherein the digital controller is configured to monitor a temperature of the various circuits by polling temperature values of the plurality of temperature sensors, and wherein the digital controller is configured to monitor at least one temperature of the plurality of temperature sensors in both an analog domain and a digital domain.

11. The radar device of claim 10 wherein the digital controller is configured to monitor a temperature in an IDLE mode of operation, where a selected temperature value is stored and read using a serial peripheral interface, SPI, clock.

12. The radar device of claim 10 wherein the temperature sensor system further comprises a switch configurable to provide an analog temperature measurement value to an output pin when the radar device is switched to an IDLE mode of operation from a FM mode of operation.

13. The radar device of claim 12 wherein the digital controller selects which temperature sensor measurement to provide to the output pin upon the radar device switching to an IDLE mode of operation.

14. A radar device comprises:
- at least one transceiver configured to support frequency modulated (FM) radar signals;
- a digital controller;
- a temperature sensor system comprising a plurality of temperature sensors coupled to various circuits in the at least one transceiver, wherein the digital controller is configured to monitor a temperature of the various circuits by polling temperature values of the plurality of temperature sensors; and
- a single analog to digital converter, ADC, operably coupled to a register and configured to convert a polled analog temperature value of one of the plurality of temperature sensors to a digital format and store the digital representation of the temperature value in the register.

15. The radar device of claim 14 wherein the single ADC supports analog to digital conversion of a plurality of temperature sensor values over at least two different ranges, whereby a first temperature range is configured to provide more resolution than a second temperature range in order to improve accuracy at the hot temperatures.

16. A method for supporting frequency modulated (FM) radar signals, wherein the frequency modulated radar signals are frequency modulated continuous wave (FMCW) signals, the method comprising:
- monitoring a temperature of various circuits in at least one transceiver of a radar device, wherein the at least one transceiver is configured to support the frequency modulated radar signals;
- receiving a plurality of temperature measurements from a plurality of temperature sensors coupled to the various circuits;
- polling temperature values of the plurality of temperature sensors;
- stopping the polling of sensor temperature values when a FMCW ramp process is started; and
- re-starting the polling of sensor temperature values following a completion of an FMCW signal generation and reception process.

17. A method for supporting frequency modulated (FM) radar signals, the method comprising:
- monitoring a temperature of various circuits in at least one transceiver of a radar device, wherein the at least one transceiver is configured to support the frequency modulated (FM) radar signals;
- receiving a plurality of temperature measurements from a plurality of temperature sensors coupled to the various circuits;
- polling temperature values of the plurality of temperature sensors; and
- selecting one of a plurality of stored temperature values as being a representative temperature.

* * * * *